(12) United States Patent
Jactat

(10) Patent No.: US 9,942,730 B2
(45) Date of Patent: *Apr. 10, 2018

(54) MOBILE RADIO COMMUNICATIONS DEVICE FOR CLOSED SUBSCRIBER GROUP MANAGEMENT

(71) Applicant: NEC CORPORATION, Tokyo (JP)

(72) Inventor: Caroline Jactat, Berkshire (GB)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,709

(22) Filed: Jun. 14, 2017

(65) Prior Publication Data

US 2017/0280305 A1    Sep. 28, 2017

Related U.S. Application Data

(63) Continuation of application No. 15/400,282, filed on Jan. 6, 2017, now Pat. No. 9,813,880, which is a
(Continued)

(30) Foreign Application Priority Data

Jun. 21, 2010   (GB) .................................. 1010393.5

(51) Int. Cl.
*H04Q 7/00* (2006.01)
*H04W 4/08* (2009.01)
(Continued)

(52) U.S. Cl.
CPC ............. *H04W 4/08* (2013.01); *H04W 8/183* (2013.01); *H04W 48/02* (2013.01)

(58) Field of Classification Search
CPC ........ H04W 4/08; H04W 48/02; H04W 8/183
(Continued)

(56) References Cited

U.S. PATENT DOCUMENTS 8,553,616 B2    10/2013  Tiwari
9,560,491 B2 *  1/2017   Jactat ................... H04W 48/02
(Continued)

FOREIGN PATENT DOCUMENTS

EP       2 166 785 A1    3/2010
JP       2012-507957 A   3/2012
(Continued)

OTHER PUBLICATIONS

Communication dated Apr. 26, 2016 from the Japanese Patent Office in counterpart Application No. 2015-109873.
(Continued)

*Primary Examiner* — Chuong T Ho
(74) *Attorney, Agent, or Firm* — Sughrue Mion, PLLC

(57) ABSTRACT

The present invention provides for a mobile radio communications device, and related method of operation, arranged for closed subscriber group selection and for the storage of closed subscriber group information in the device, the stored information including information configured as a whitelist of closed subscriber group identities delivered between non-access-stratum layer and access-stratum layer within the device, and the device being further arranged to remove a previous user-selected closed subscriber group identity from the whitelist responsive to the device connecting to a cell is different from that identified by the previous user-selected closed subscriber group identity, and which different cell can comprise for example a non-CSG cell.

8 Claims, 3 Drawing Sheets

Related U.S. Application Data continuation of application No. 13/805,603, filed as application No. PCT/JP2011/064613 on Jun. 20, 2011, now Pat. No. 9,560,491.

(51) Int. Cl.
*H04W 8/18* (2009.01)
*H04W 48/02* (2009.01)

(58) Field of Classification Search
USPC ....... 370/434, 436, 411, 310, 312, 332, 328, 370/338
See application file for complete search history.

(56) References Cited

U.S. PATENT DOCUMENTS

| | | | |
|---|---|---|---|
| 9,788,268 B2* | 10/2017 | Maeda | H04W 48/20 |
| 2009/0168727 A1 | 7/2009 | Somasundaram et al. | |
| 2009/0305699 A1 | 12/2009 | Deshpande et al. | |
| 2010/0069069 A1 | 3/2010 | Lee et al. | |
| 2010/0075670 A1 | 3/2010 | Wu | |
| 2010/0110945 A1 | 5/2010 | Koskela et al. | |
| 2010/0130197 A1 | 5/2010 | Wu | |
| 2010/0197277 A1 | 8/2010 | Jung et al. | |
| 2010/0197310 A1 | 8/2010 | Jung et al. | |
| 2010/0203865 A1 | 8/2010 | Horn et al. | |
| 2010/0240349 A1 | 9/2010 | Jung et al. | |
| 2011/0069658 A1 | 3/2011 | Tiwari | |
| 2011/0170517 A1* | 7/2011 | Bakker | H04W 36/0033 370/331 |
| 2011/0171915 A1* | 7/2011 | Gomes | H04W 24/10 455/73 |
| 2011/0171975 A1 | 7/2011 | Yin | |
| 2011/0171983 A1 | 7/2011 | Tiwari | |
| 2011/0223887 A1 | 9/2011 | Rune et al. | |
| 2012/0020295 A1 | 1/2012 | Tiwari | |
| 2014/0119270 A1 | 5/2014 | Zhang et al. | |
| 2016/0373974 A1 | 12/2016 | Gomes et al. | |

FOREIGN PATENT DOCUMENTS

| | | |
|---|---|---|
| WO | 2009/088703 A1 | 7/2009 |
| WO | 2009/115897 A1 | 9/2009 |
| WO | 2010/015207 A1 | 2/2010 |
| WO | 2010/036011 A2 | 4/2010 |
| WO | 2010/037303 A1 | 4/2010 |
| WO | 2010/059122 A2 | 5/2010 |

OTHER PUBLICATIONS

"UTRA HNB Idle Mode (Re)selection and UE Access Control", Qualcomm Europe, URL:http://www.3gpp.org/ftp/tsg_ran/WG2-RL2/TSGR2_62bis/Docs/R2-083392.zip, Jun. 30-Jul. 4, 2008, pp. 1-5.
"3rd Generation Partnership Project; Technical Specification Group Services and System Aspects; Service requirements for Home NodeBs and Home eNodeBs", 3GPP TS 22.220 V9.3.0, URL:http://www.3gpp.org/ftp/Specs/archive/22_series/22.220/22220-930.zip, Dec. 19, 2009, pp. 1-22.
"CSG and idle mode mobility", T-Mobile, NTT DoCoMo, Nokia, Nokia Siemens Networks, Huawei, Ericsson, Telecom Italia,Orange, URL:http://www.3gpp.org/ftp/tsg_ran/WG2_RL2/TSGR2_60bis/Docs/R2-080002.zip, Jan. 14-18, 2008, pp. 1-28.
International Search Report, PCT/JP2011/064613, dated Aug. 2, 2011.
United Kingdom, GB1010393.5, dated Oct. 13, 2010.
Written Opinion of the International Search Authority, dated Aug. 2, 2011.
Office Action dated Apr. 12, 2017, in U.S. Appl. No. 15/400,282.
Office Action dated May 18, 2016, in U.S. Appl. No. 13/805,603.
Office Action dated Oct. 8, 2015, in U.S. Appl. No. 13/805,603.
Office Action dated Apr. 29, 2015, in U.S. Appl. No. 13/805,603.
Office Action dated Nov. 6, 2014, in U.S. Appl. No. 13/805,603.
Communication dated May 30, 2017, issued from the European Patent Office in corresponding Application No. 11798280.1.
"3rd Generation Partnership Project; Technical Specification Group Core Network and Terminals; Non-Access-Stratum (NAS) functions related to Mobile Station (MS) in idle mode (Release 10)" 3GPP TS 23.122 V10.0.0, Jun. 14, 2010, pp. 1-41.
Notice of Allowance dated Jul. 7, 2017 from U.S. Patent & Trademark Office in counterpart U.S. Appl. No. 15/400,282.
Communication dated Sep. 5, 2017 from the Japanese Patent Office in counterpart Application No. 2016-197950.

* cited by examiner

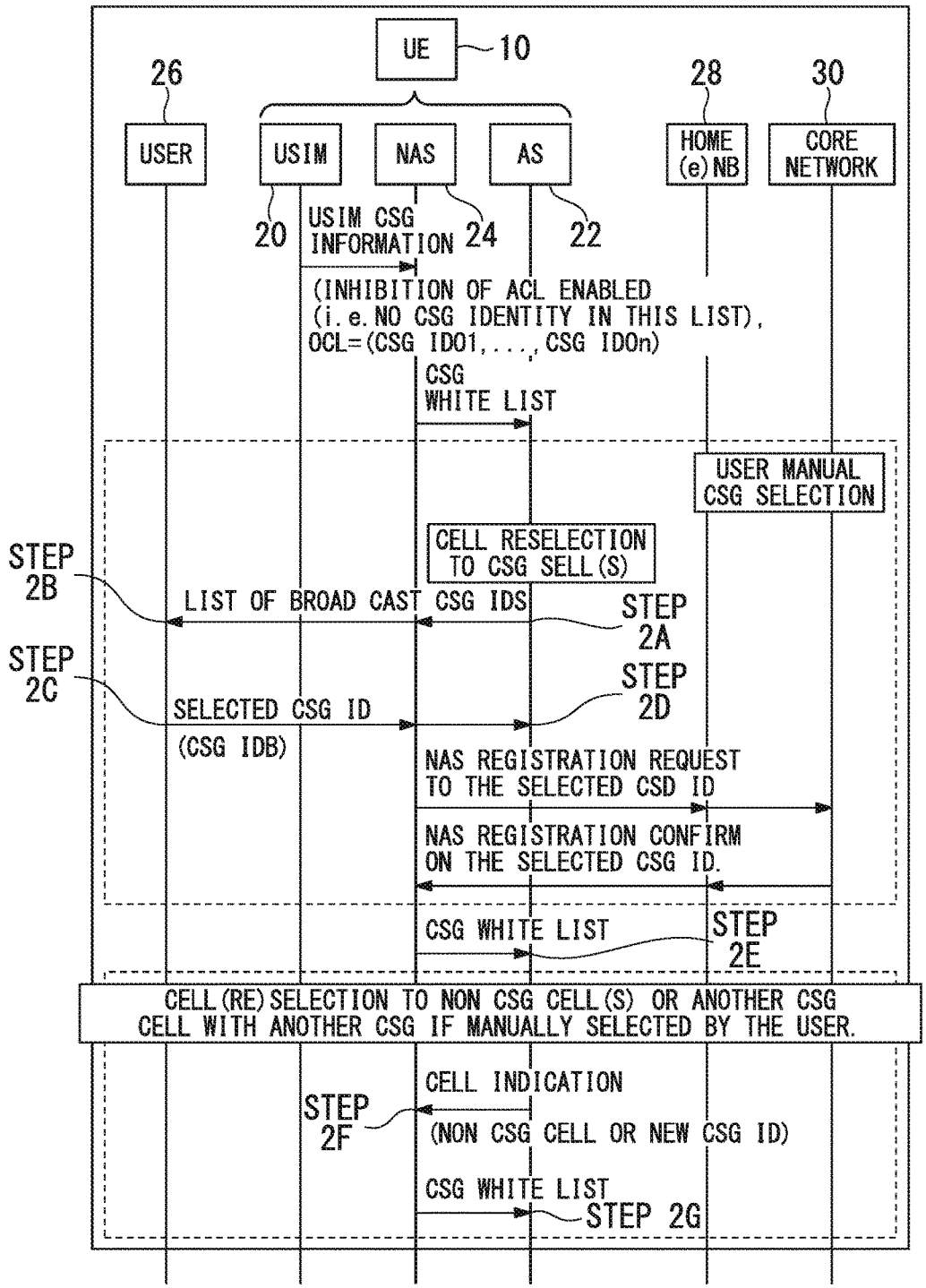

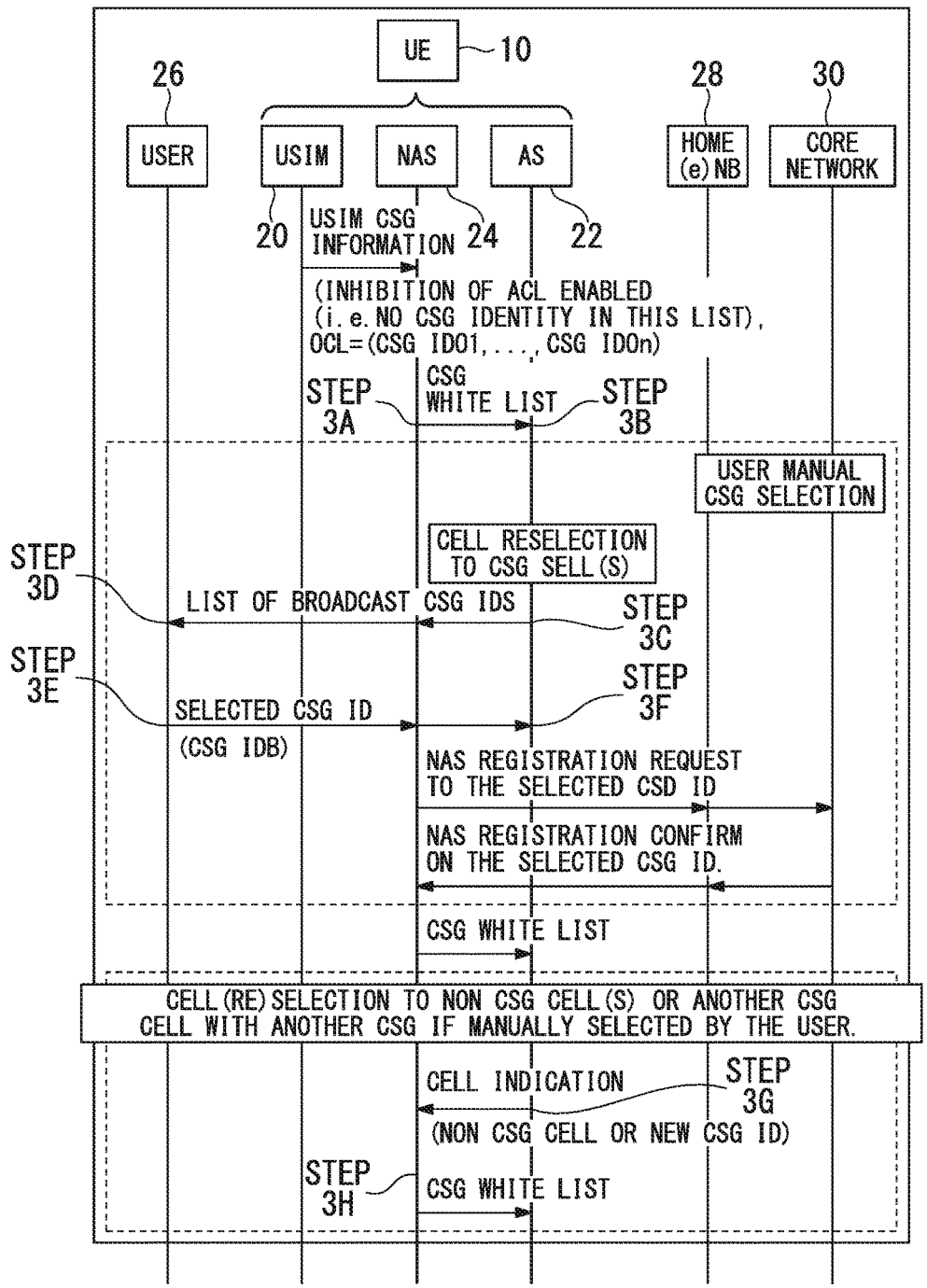

MOBILE RADIO COMMUNICATIONS DEVICE FOR CLOSED SUBSCRIBER GROUP MANAGEMENT

CROSS REFERENCE TO RELATED APPLICATIONS

This application is a continuation of U.S. application Ser. No. 15/400,282 filed Jan. 6, 2017, which is a continuation application of U.S. application Ser. No. 13/805,603 issued as U.S. Pat. No. 9,560,491, filed Feb. 12, 2013, which is a National Stage of International Application No. PCT/JP2011/064613 filed Jun. 20, 2011, which claims priority from United Kingdom Patent Application No. 1010393.5, filed Jun. 21, 2010, the contents of all of which are incorporated herein by reference.

TECHNICAL FIELD

The present invention relates to a mobile radio communications device, and related method of operation, arranged particularly for Closed Subscriber Group (CSG) functionality.

BACKGROUND ART

The functionality afforded mobile radio communications devices such as cell phone handsets has been increasingly defined by reference to the Third Generation Partnership Project (3GPP) proposals and standards and which has focused most recently upon ongoing improvements to the Universal Mobile Telecommunications System (UMTS) such as the Long Terminal Evolution (LTE) ongoing improvement thereto. The present invention relates in particular to 3GPP LTE compatible wireless communication systems and in particular E-UTRAN resources which can employ relatively small building-focused cells such as so-called femtocells.

The User Equipment (UE) forming the mobile terminal devices found for example within UMTS systems can benefit from increasingly diverse functionality. One such feature, which can prove particularly advantageous within a femtocell environment, is CSG functionality.

Within a CSG arrangement, a group of one or more cells, e-NodeBs or base stations or otherwise, are provided for which access is restricted to a limited group of one or more users. The members of that restricted group can benefit from their access to the sub group of cells due to the specific/improved services available via those restricted cells.

A CSG is commonly administered by a network operator wishing to reserve access to certain cells within their mobile network. In this manner, an identifier, such as a CSG ID is commonly broadcast by each restricted cell, by way of its system information. Each UE operating within the network may only select such a restricted cell if the broadcast CSG ID is already found within a list stored within the UE. Any appropriate configuration of such list or lists, can be provided and they can commonly comprise a so-called "operator controlled CSG list" and/or and an "allowed CSG list". Such lists are commonly stored within the USIM of the UE.

A hybrid CSG cell can also be provided that comprises a CSG cell for access by permitted users, by way of operator subscription, but also by some users that do not have an operator subscription.

Automatic selection can then be made responsive to a match between the CSG ID broadcast by a restricted cell, and the content of the "operator controlled" and "allowed" lists stored in the UE. Alternatively, or in addition, the user can manually search for CSG cells of potential interest and, once found, request the UE to attempt to register to a restricted cell even though the CSG ID is neither within its "operator controlled" or "allowed" CSG lists. In spite of such absence from the lists, should registration to the restricted cell prove successful, the CSG ID of that selected cell can then be added to the "allowed CSG list".

Thus, automatic and manual registration to the restricted cell is possible.

Insofar as the selection of CSG IDs stored within the UE and, in particular within the "operator controlled CSG list" can be determined by the network operator, further control functionality is afforded the operator insofar as the operator can selectively inhibit the use of the above-mentioned "allowed CSG list". Accordingly, although a manual selection process might have led to successful registration to a restricted cell, the aforementioned inhibition can be employed by the operator such that the CSG ID of that cell is not subsequently added to the "allowed CSG list" so as to inhibit subsequent automatic selection of that cell.

Insofar as the user-controlled CSG list within the UE, i.e. the above-mentioned "allowed CSG list", can therefore be inhibited by the network, disadvantageously limiting and potentially problematic scenarios can develop should the UE, by performing a manual CSG selection, attempt to move to a CSG cell whose identity is not found within the "operator controlled CSG list". That is, in further detail, if, for some reason, the radio signal quality derived from the restricted cell remains insufficient, a different cell which may not be restricted is likely to be selected by the UE. However, as and when the radio signal from the restricted cell improves, automatic reselection of that restricted cell will not be possible and the user will have to again attempt manual selection of the CSG cell. As will be appreciated, the absence of the CSG ID from the "operator controlled CSG list", and the inhibiting of the "allowed CSG list" serves to prevent such automatic selection.

Yet further, if there are several restricted cells each having the same CSG ID, which might be required to ensure proper coverage within a certain area, for example several rooms within a building accordingly femtocell arrangement, the other restricted cells will not be selected automatically. As the UE moves cells, even though the signal from the selected cell might again become too weak another related restricted cell providing the appropriate service will not be automatically selected due, as noted above, to the absence of these CSG identified from the "operator controlled CSG list" and the inhibiting of the "allowed CSG list".

In situations in which the restricted cells are likely to provide specific and/or such improved services, such scenarios are quite clearly disadvantageously limited and repeated manual intervention is required each time in an attempt to resume such services.

Various control and management arrangements for CSG scenarios are known in the current art and one example comprises the subject matter of US-A-2010/0110945. This document discloses a system and method for providing CSGs within a packet-based wireless communications system and relates, in particular, to a manner in which CSG identities are handled within the UE for the performance of cell selections and re-selections.

Illustrative of the nature of the problems and limitations found in the prior art, it is noted that the subject matter of US 2010/0110945 has no disclosure nor suggestion as to how to handle CSGs that are not allowed in the whitelist due in particular to network operator inhibition.

Further, the signaling arrangement disclosed within this document is disadvantageously limited.

DISCLOSURE OF INVENTION

The present invention seeks to provide a mobile radio communications device and related management method, employing CSG and which exhibits advantages over known such devices and methods.

According to a first aspect of the present invention, there is provided a mobile radio communications device arranged for closed subscriber group selection and for the storage of closed subscriber group information, the stored information including information configured as a white list of closed subscriber group identities delivered between non-access-stratum layer and access-stratum layer within the device, and the device being further arranged to remove a previous user-selected closed subscriber group identity from the white list responsive to the device connecting to a cell is different from that identified by the previous user-selected closed subscriber group identity.

The invention is advantageous in responding to network operator inhibition within the whitelist and which leads to a requirement for manual selection. In particular, the invention facilitates this through removal of the "inhibited" CSG ID and such that manual selection will then have to be pursued.

Compared with the current art therefore, the user can readily perform manual CSG selection.

Advantageously, the removal of the previous user-selected closed subscriber group identity is responsive to the device connecting to a non-CSG cell or a CSG cell different from that identified by the previous user-selected closed subscriber group identity.

Further, the white list can be under non-access stratum control and wherein no indication is provided to the access stratum as to whether a user-controlled closed subscriber group list is network-inhibited.

In this manner, the non-access stratum layer can notify the whitelist to the access stratum layer once updated by the removal.

As an alternative of course, the method can include an access stratum controlled white list.

Preferably, the device can be arranged such that an indicator is provided to the access stratum as whether a user-controlled closed subscriber white list is network-inhibited. Also, responsive to the device connecting to a cell comprising a different closed subscriber group identity, the aforesaid new identity can serve to supersede the removed identity.

In a particular arrangement, the removal of a previous user-selected closed subscriber group identity occurs subsequent to network-inhibition of an allowed closed subscriber group list within the device.

According to another aspect of the present invention, there is provided a method of managing closed subscriber group selection in a mobile radio communications device and including the step of storing closed subscriber group information configured as a whitelist of closed subscriber group identities to be delivered between a non-access stratum layer and an access stratum layer within the mobile radio communications device, and removing a previous user-selected closed subscriber group identifier from the white list responsive to the device connecting to a cell which is different from that identified by the previous user-selected closed subscriber group identifier.

As with the device discussed above, the step of removal can responsive to connection to a non-closed subscriber group cell or to a different closed subscriber group cell.

Also, the method can provide for non-access stratum control of the white list or access stratum-control of the white list.

Yet further, the removed user-selected closed subscriber group identifier can be superseded when the device connects to a cell comprising a new closed subscriber group identifier.

The invention can also provide for a computer program, computer program product or computer readable medium, comprising instructions that carry out a method as defined above.

Also within the scope of the present invention is a mobile communications system including a mobile radio communications device as defined above and a network device arranged to communicate closed subscriber groups signaling with the mobile radio communications device.

As will therefore be appreciated, the present invention relates to improvements for manual CSG selection in situations that arise subsequent to inhibition of the "user controlled CSG list" within the UE by the network. As discussed, UMTS and LTE radio access systems and services in particular can benefit from the present invention. Within the present invention the mobile radio communications device such as the UE, and the related mentioned method, can offer advantages in CSG selection through signaling achieved at non-access stratum and access stratum levels through interaction with, generally, a single CSG identity within, preferably volatile memory within the device. As will be appreciated from the foregoing, and the detailed description that follows, a principal advantage of the present invention is that a user can readily avoid a need to repeat a manual CSG selection procedure when moving between cells covered by the same CSG and non-CSG cells in particular.

BRIEF DESCRIPTION OF THE DRAWINGS

The invention is described further hereinafter, by way of example only, with reference to the accompanying drawings:

FIG. 2 is a signaling diagram arising in relation to one aspect of the present invention; and FIG. 3 is a signaling diagram relating to signaling arising in relation to a further aspect of the present invention.

EMBODIMENTS FOR CARRYING OUT THE INVENTION

Figure 1:
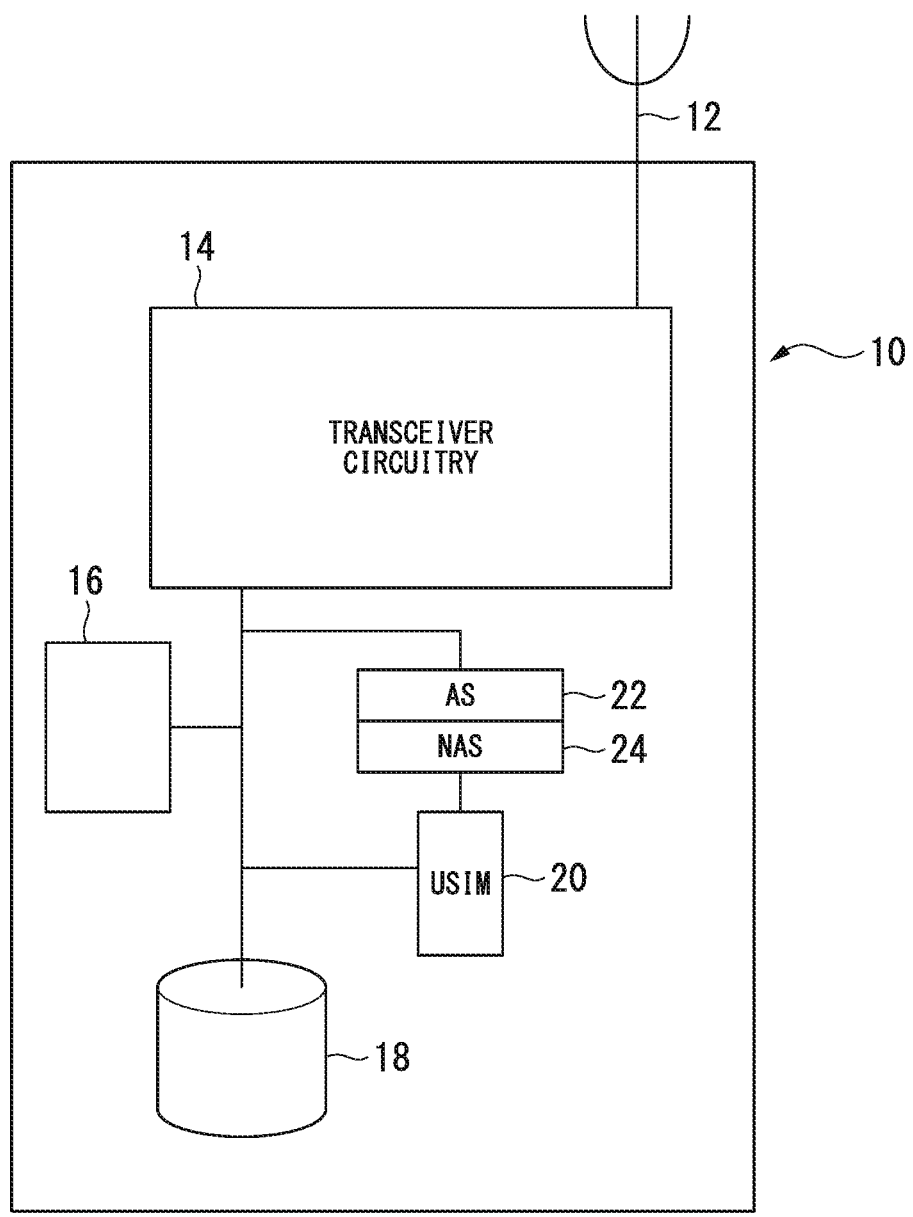
FIG. 1 is a schematic block diagram of a mobile radio communications device according to an embodiment of the present invention.

Turning first to FIG. 1, there is provided a schematic diagram of the mobile radio communications device in the form of a cell phone handset 10 having a signaling phase comprising a standard 10 and 12 and transceiver circuitry 14 and while functional processing 16 and storage 18 are also indicated.

The device also employs a USIM 20 for provision of the usual user-related functionality and which in this illustrated embodiment, is arranged to include a storage location, preferably having a volatile element, for storing both and "operator controlled CSG list" and an "allowed CSG list". As discussed above, the "operator controlled CSG list" can comprise a list of CSG IDs to-which the network operator allows connection by the handset 10 whereas the "allowed CSG list" can comprise a historical list of restricted cells that the handset 10 has previously successfully connected to even though they did not appear in the "operator controlled CSG list".

An important aspect of the illustrated embodiment of the present invention is the use of signaling arising between the Access Stratum (AS) and Non-Access Stratum (NAS) of the protocol stack within the handset 10 and which respective layers 22, 24 are also illustrated schematically within FIG. 1.

As is discussed in further detail in relation to FIGS. 2 and 3 below, the NAS layer 24 is arranged to receive signaling in accordance with the present invention from the USIM 20 and to interact with the AS layer 22.

Central to the illustrated embodiments of the present invention is the provision of a CSG whitelist preferably within volatile memory of the handset 10 and which whitelist can be configured in signaling arising between the AS 22 and the NAS 24 layers within the handset 10.

Advantageously, at most one user-selected CSG identity within the CSG whitelist is employed and, as discussed below, the required control of the CSG whitelist can advantageously be achieved by way of the NAS or indeed the AS.

The further illustration of embodiments of the present invention provided by FIGS. 2 and 3 relate respectively to a NAS-controlled CSG whitelist, and an AS-controlled CSG whitelist.

Although discussed in further detail below it should be appreciated that, with the NAS 24 controlling the CSG whitelist, it is apparent that the AS does not have nor receive any indication as to whether the "allowed CSG list" is being inhibited by the network or not.

However, whenever the handset 10 moves to a non-CSG cell, or indeed to a cell belonging to a different CSG cell (neither of which belong to the "operator controlled CSG list" the NAS layers are advantageously arranged to remove the previous user CSG identity from the CSG whitelist. Further, the NAS layer can also be arranged to notify the updated CSG whitelist (i.e. the list with the aforementioned "previous user CSG identity" removed) to the AS layer 22.

As an alternative arrangement for the present invention, and in which the AS-controlled CSG whitelist is provided, the AS can be provided with an indication as to whether the "allowed CSG list" has been inhibited or not by the network and on the basis of an indication provided by the NAS. Again making reference to movement of the handset 10 to a non-CSG cell, or indeed to a cell belonging to a different CSG (both which again are not found within the "operator controlled CSG list") the AS 22 serves to remove the previous user CSG identity from the CSG whitelist.

Thus, with regard to both scenarios above, it will be appreciated that the advantageous operation of the present invention, and the limitations found within the prior art, can be achieved through simple handling of at most one user CSG identity within the CSG whitelist.

The invention provides a means for, the UE to achieve inhibition of the "allowed CSG list" in, for example, the ME and, as noted, by handling at most one user CSG identity. Turning now to a more detailed discussion of examples of signaling arrangements according to the embodiments of the present invention, reference is made to FIGS. 1 and 2. As noted above, FIG. 1 illustrates an example of the present invention employing a NAS-controlled CSG whitelist, whereas FIG. 2 provides illustration of an example employing an AS-controlled CSG white list.

Where appropriate, like reference numerals are used in both drawings as are the following CSG related acronyms.

ACL: This relates to the Allowed CSG List and which comprises a list of "user controlled" CSG identities and there respective HMD name if any and so relate to the "allowed CSG list" discussed above.

OCL: This identifies an Operator CSG List which comprises a list of "operator controlled CSG identities" and the respective HMB name if any and, as discussed above, comprises the list of CSG IDs relating to the restricted cells to which access is allowed by the Operator.

CSG whitelist: As used with reference to FIGS. 2 and 3 and indeed throughout the present application, this signifies an internal list of CSG identities between the NAS and AS within the handset 10 and which list contains the sum of the CSG IDs of the ACL and the OCL.

Turning first to FIG. 2 there is provided a signaling diagram arising in relation to UE in the form of mobile phone handset 10 including the USIM 20, AS 22 and NAS 24 also illustrated schematically in FIG. 1. To complete the potential signaling path, a network node 28 and the related core network 30 are also illustrated in FIG. 2 as indeed is referenced to a user 26 selectively operating the UE 10.

It should be appreciated that the aspect of the embodiment of the present invention illustrated in FIG. 2 relates to the provision of a NAS-controlled CSG whitelist Referring to the signaling in turn, within the UE 10, the USIM 20 provides USIM CSG information signaling to the NAS 24 and at which confirms inhibition of the ACL.

Signaling comprising the configured CSG white list is then delivered from the NAS 24 to the AS 22 and the procedure then follows a path involving manual CSG selection by the use of 26, i.e., in an attempt to connect to a restricted cell not identified in the "operator controlled CSG list".

In step 2A, the AS 22 provides for a list of broadcast CSG IDs which, as illustrated, can be delivered to the user 26 for display as appropriate. The list of broadcast CSG IDs may contain CSG IDs not pertaining to the OCL. In step 2B, the list of broadcast CSG IDs is displayed to the user 26. From reference to the list, the user can select a CSG ID which is not found within the OCL in step 2C and signaling relating to that selection is delivered to the NAS 24 and subsequently the AS 22 wherein the requested CSG ID is selected in step 2D. Ongoing network signaling is then delivered to the network node 28 and into the core network 30, and from which NAS registration confirmation signaling concerning the selected CSG ID is returned.

Further signaling between the NAS 24 and AS 22 in step 2E relates to a further configuration of the CSG white list which now includes the recently selected CSG ID.

The particular aspects of the illustrated embodiment of the present invention of FIG. 2 are now apparent from the subsequent signaling and following description which can relate to either a cell (re)selection to a non-CSG cell, or indeed to another CSG cell having another CSG ID manually selected by the user 26.

Cell indication signaling is returned from the AS 22 to the NAS 24 and which, as noted, serves to identify a non-CSG cell, or indeed a new CSG ID to which connection can be made in view of the apparent failure (perhaps for signal strength/quality reasons) to connect to the newly selected CSG. In case of new user CSG ID, the steps from "User manual CSG selection" apply here and are not mentioned again to overloading scenario in step 2F. Upon receipt of that signaling in step 2F, the NAS 24 is arranged to add, if appropriate, the new user CSG ID to the CSG white list although, subsequently, in accordance with the present invention, the CSG white list returned from the NAS 24 has had the previous user CSG identity removed and, further, the NAS 24 can be arranged to notify the duly further updated CSG white list to the AS layer 22 in step 2G.

As will be appreciated, upon outbound mobility to a non-CSG cell, the NAS 24 removes the previous user CSG ID from the CSG white list in step 2G. However, upon outward mobility to a CSG cell having another user CSG identity different from the previous user CSG identity, the NAS 24 supersedes the previous CSG identity with the new user CSG identity within the CSG white list.

Turning now to FIG. 3, there is provided a similar timing diagram to that of FIG. 2 and involved in the same handset 10 and associated USIM 20, NAS 24 and AS 22, network node 28 and core network 30 and similar user 26. As will be appreciated, FIG. 3 relates to an embodiment in which the CSG white list is AS-controlled and, within the initial CSG white list signaling from the NAS 24 to the AS 22, there is provided an indication from the NAS 24 that the user controlled CSG selection i.e. that illustrated by the "allowed CSG list" is to be inhibited in step 3A and the CSG white list and its cells will be stored at the AS 22 in step 3B for use in the subsequent cell (re)selection procedure.

A manual user CSG selection procedure in steps 3C to 3F then continues in the same manner as in relation to FIG. 2, concluding with an NAS registration confirmation having regard to the selected CSG ID delivered from the core network 30 and via the network node 28 to the NAS layer 24.

Within the final (re)selection procedure either to a non-CSG cell, or to another CSG cell having a different CSG ID manually selected by the user, cell indication signaling is delivered from the AS layer 22 to the NAS layer 24 in accordance with specific features of the present invention. The cell indication comprises a non-CSG cell, or new CSG cell ID and, in the case of the former, the AS 22 removes the previous user CSG identity from the CSG white list in step 3G. In the case of the latter, however, the AS 22 supersedes the previous user CSG identity with the new identity in the CSG white list in step 3G. In the NAS 24, in case of new user CSG ID, the steps from "User manual CSG selection" apply here and are not mentioned again to avoid overloading scenario in step 3H.

It should of course be appreciated that the invention is not restricted to the details of the forgoing embodiment and in particular, the exact signaling arrangements illustrated in relation to FIGS. 2 and 3 nor indeed the hardware embodiment illustrated with reference to FIG. 1.

INDUSTRIAL APPLICABILITY

The present invention can be applied to a mobile radio communications device arranged particularly for Closed Subscriber Group (CSG) functionality. According to the present invention, a user can readily avoid a need to repeat a manual CSG selection procedure when moving between cells covered by the same CSG and non-CSG cells in particular.

What is claimed is:

1. A method performed by a mobile radio communications device, the method comprising:
    displaying, to a user, at least one available Closed Subscriber Group (CSG);
    providing a CSG whitelist from a non-access stratum layer (NAS) to an access stratum layer (AS) within the mobile radio communications device;
    providing, from the NAS to the AS, an updated CSG whitelist when contents of the CSG whitelist have changed; and
    adding a CSG identity to an Allowed CSG list when an attempt to register to a cell of a CSG selected by a manual CSG selection is accepted.

2. A method according to the claim 1, wherein the CSG whitelist is a combination of the Allowed CSG list and an Operator CSG list.

3. A method according to the claim 1, wherein the CSG identity is added to the Allowed CSG list unless the CSG identity is already present in the Allowed CSG list.

4. A method according to the claim 1, wherein the at least one available CSG is displayed for a manual CSG selection.

5. A mobile communications device comprising:
    at least one memory; and
    a processor configured to:
        display, to a user, at least one available Closed Subscriber Group (CSG);
        provide a CSG whitelist from a non-access stratum layer (NAS) to an access stratum layer (AS) within the mobile radio communications device;
        provide, from the NAS to the AS, an updated CSG whitelist when contents of the CSG whitelist have changed; and
        add a CSG identity to an Allowed CSG list when an attempt to register to a cell of a CSG selected by a manual CSG selection is accepted.

6. A mobile communications device according to the claim 5, wherein the CSG whitelist is a combination of the Allowed CSG list and an Operator CSG list.

7. A mobile communications device according to the claim 5, wherein the CSG identity is added to the Allowed CSG list unless the CSG identity is already present in the Allowed CSG list.

8. A mobile communications device according to the claim 5, wherein the at least one available CSG is displayed for a manual CSG selection.

* * * * *